W. H. LAUBACH,
Assignor by Mesne Assignment to P. P. PRATT.
FIRE-EXTINGUISHER.
No. 7,395. Reissued Nov. 14, 1876.
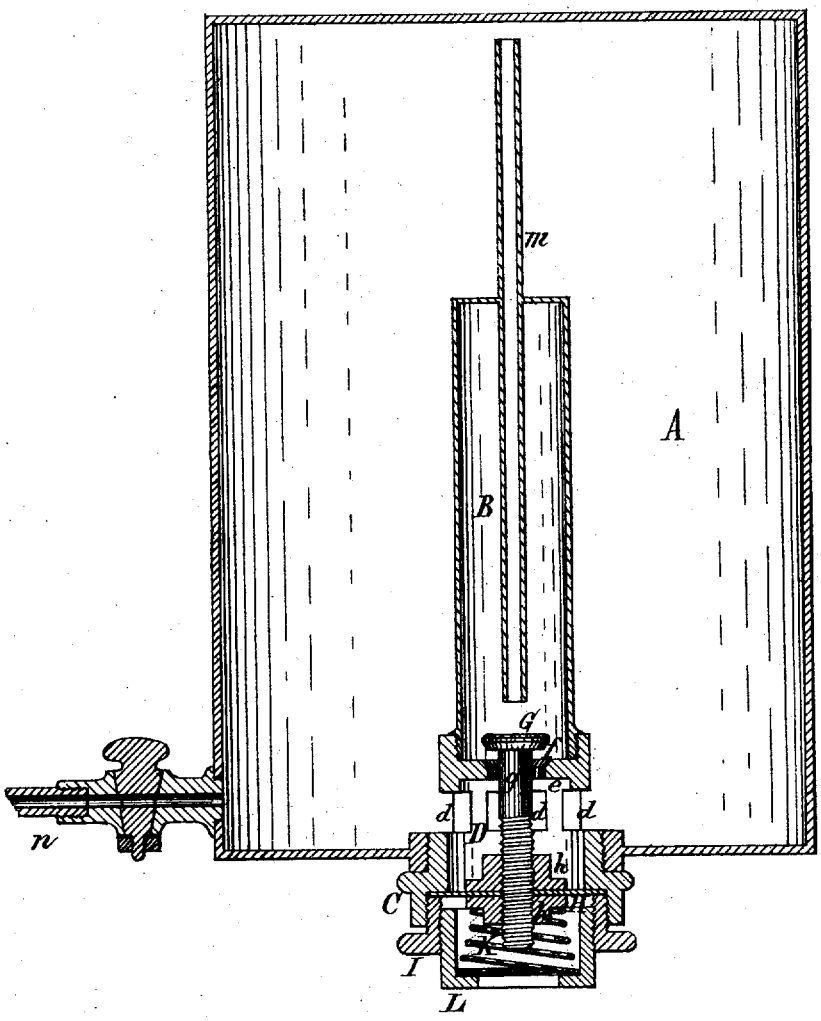
George H. Sykes
Charles J. Buchheit
Witnesses.
Pascal P. Pratt
assn of W. H. Laubach
By Edward Wilkes
Attorney.
THE GRAPHIC CO. N.Y.

UNITED STATES PATENT OFFICE.

WILLIAM H. LAUBACH, OF PHILADELPHIA, PENNSYLVANIA, ASSIGNOR, BY MESNE ASSIGNMENTS, TO PASCAL P. PRATT, OF BUFFALO, N. Y.

IMPROVEMENT IN FIRE-EXTINGUISHERS.

Specification forming part of Letters Patent No. 82,421, dated September 22, 1868; reissue No. 7,395, dated November 14, 1876; application filed October 20, 1876.

*To all whom it may concern:*

Be it known that W. H. LAUBACH, of the city of Philadelphia, in the county of Philadelphia and State of Pennsylvania, has invented certain Improvements in Chemical Fire-Extinguishers, which improvements are fully set forth in the following specification, reference being had to the accompanying drawing.

This invention relates to a fire-extinguisher in which carbonic-acid gas is generated by the commingling of suitable chemicals or ingredients, and in which portions of the one chemical or ingredient are alternately permitted to mix with portions of the other ingredient, and restrained from mixing therewith automatically, so as to generate the gas as required, and maintain a nearly uniform predetermined gas-pressure in the apparatus.

In the accompanying drawing, this apparatus is shown in the position in which it is arranged when required for use.

A is the outer case, made of suitable metal. B is an inner vessel, made of suitable sheet metal or glass, and supported on the lower head of the outer case A by means of a screw-cap, C, and hollow tube D, provided with openings *d*. As shown in the drawing, the inner vessel B is connected with the upper end of the tube D, which latter is provided near its top with a horizontal plate, *e*, forming the bottom of the inner vessel B. The plate *e* is provided with a central opening and valve-seat, *f*, as clearly shown. G is a valve, arranged within the inner vessel B, so as to close against the seat *f*. It is provided with a stem, *g*, extending through the tube D, and connected to a flexible diaphragm or movable plate, H, to which it is secured by two screw-nuts, *h h*, as shown. The diaphragm H is secured to the screw-cap C by a screw cap or gland, I. K is a spiral spring bearing against the outer side of the diaphragm H, and L an adjustable cap confining the spring K. As shown in the drawing, the cap L is screwed into the gland I, so that, by screwing or unscrewing the cap L, the pressure which the spring K exerts upon the diaphragm H can be regulated. *m* is a vent-tube arranged with the inner vessel B, so as to be partly within and partly without the same. The portion of the vent-tube outside of the vessel B must project above the liquid-level in the outer case. *n* is the outlet-pipe of the apparatus, provided with a suitable stop-cock and hose.

In charging the apparatus, it is placed in a reversed position from that shown in the drawing. The cap C is first detached and removed with the inner vessel B from the case A. In the latter is introduced a suitable quantity of alkali, together with the desired quantity of water. In the inner vessel B is placed a suitable acid, corresponding with the nature and quantity of the alkali in the outer case, the vent-tube *m* preventing the acid from escaping from the vessel B when a liquid acid is employed. When the two vessels or chambers are so charged, the vessel B is secured within the outer vessel A, as shown in the drawing.

When the apparatus is required for use, it is reversed or placed in the position shown in the drawing, when its operation will be as follows: When the acid placed in the inner vessel B is in a solid form—as, for instance, tartaric acid—or when a solid alkali is placed in the inner vessel B and an acid solution in the outer vessel, the liquid contained in the outer vessel, which in the former case is alkaline, and in the latter case acidulated, will pass through the openings *d*, and up through the valve-seat *f* into the inner vessel B, where it comes in contact with the solid chemical contained therein, and generates carbonic-acid gas, which escapes through the vent-tube *m* into the outer case, creating a pressure in the same. As soon as this pressure, acting upon the flexible diaphragm H, overcomes the pressure of the spring K, the valve G is closed, and the commingling of the ingredients and further generation of gas prevented, until the pressure of the case A is decreased by drawing off the liquid through the escape-pipe *n*. The small quantity of liquid left in the inner vessel B, when the valve G is closed, will generate a correspondingly small quantity of gas, that will escape through the vent-tube *m*.

When a liquid acid is placed in the inner vessel B—such, for instance, as sulphuric acid—and the outer case A charged with a suitable alkali solution—as, for instance, a solution of bicarbonate of soda—the column of acid in the inner vessel, owing to its greater specific gravity, will preponderate over a considerable higher column of alkaline solution in the outer vessel, thereby preventing the alkaline solution from entering the inner vessel when the valve G is open, and causing the acid to escape into the outer vessel, generating carbonic-acid gas in the same, which passes into the inner vessel B through the vent-tube *m*, thus establishing an equilibrium in both. When the desired pressure is produced, the valve G will be closed, as above described, when the further escape of the acid into the outer vessel and generation of gas will be prevented. Upon reducing the pressure in the outer vessel A by discharging a portion of the liquid through the tube *n*, as in case of fire, or in any other manner, the valve G will be immediately opened under the pressure of the spring K, and the gas confined in the upper portion of the inner vessel B will expand, and thereby force a portion of the acid contained in the inner vessel B through the opening *e* into the outer vessel A, where the acid so discharged comes in contact with the alkali solution, and generates carbonic-acid gas. This discharge of the acid will continue until the former pressure has been reproduced in the outer vessel, when the valve G is closed by the gas-pressure acting upon the diaphragm H, thereby preventing the further escape of acid from the inner vessel, and arresting the gas-generation. In this manner portions of the liquid ingredients are alternately permitted to mix, and are restrained from mixing automatically, so that a uniform pressure is maintained in the apparatus in accordance with the pressure applied to the diaphragm H. When the column of alkali solution preponderates over the column of acid in the inner chamber when the apparatus is reversed, the alkali solution will enter the inner vessel B through the opening *e*, and raise the acid column in the vent-tube *m* to a height at which it is in equilibrium with the column of the alkali solution in the outer vessel. At the same time carbonic-acid gas will be generated at the point of contact of the two liquids. The gas so generated rises partly through the vent-tube into the outer case A, and partly into the upper portion of the inner vessel B. As the gas accumulates in the inner vessel B, it exerts a pressure upon the surface of the acid in the inner vessel, displacing a portion thereof, and forcing it out through the opening *e* into the outer vessel, where the generation of gas continues until the desired pressure is obtained, when the valve G will be closed. The further operation of the apparatus will be as above described.

Having thus fully described the invention of the said W. H. LAUBACH, what I claim as new, and desire to secure by Letters Patent, is—

1. A chemical fire-extinguisher and carbonic-acid-gas generator having two vessels or chambers, each containing one of the chemicals or ingredients, and in which a device controlling the flow of the ingredient from one vessel or chamber into the other is actuated automatically, substantially as and for the purpose hereinbefore set forth.

2. A chemical fire-extinguisher and carbonic-acid-gas generator in which portions of the liquid acid and alkali solution are alternately permitted to mix, and are restrained from mixing automatically, as the variations of pressure render necessary.

3. The combination, with the outer vessel A and inner vessel B, of the valve G, connected with flexible diaphragm H, substantially as and for the purpose hereinbefore set forth.

4. In a chemical fire-extinguisher, the combination, with the flexible diaphragm H, of the spiral spring K, substantially as and for the purpose hereinbefore set forth.

5. The combination, with the flexible diaphragm H, of the spiral spring K and adjustable cap L, substantially as and for the purpose hereinbefore set forth.

6. The combination, with the outer vessel A and inner vessel B, of the vent-tube *m*, substantially as and for the purpose hereinbefore set forth.

PASCAL P. PRATT.

Witnesses:
EDWARD WILHELM,
P. P. BEALS.